Sept. 21, 1965 S. H. HOLMES 3,206,837
METHOD OF MANUFACTURING A RECIPROCAL FOUR-WAY SPOOL VALVE
Original Filed Nov. 7, 1958 3 Sheets-Sheet 1
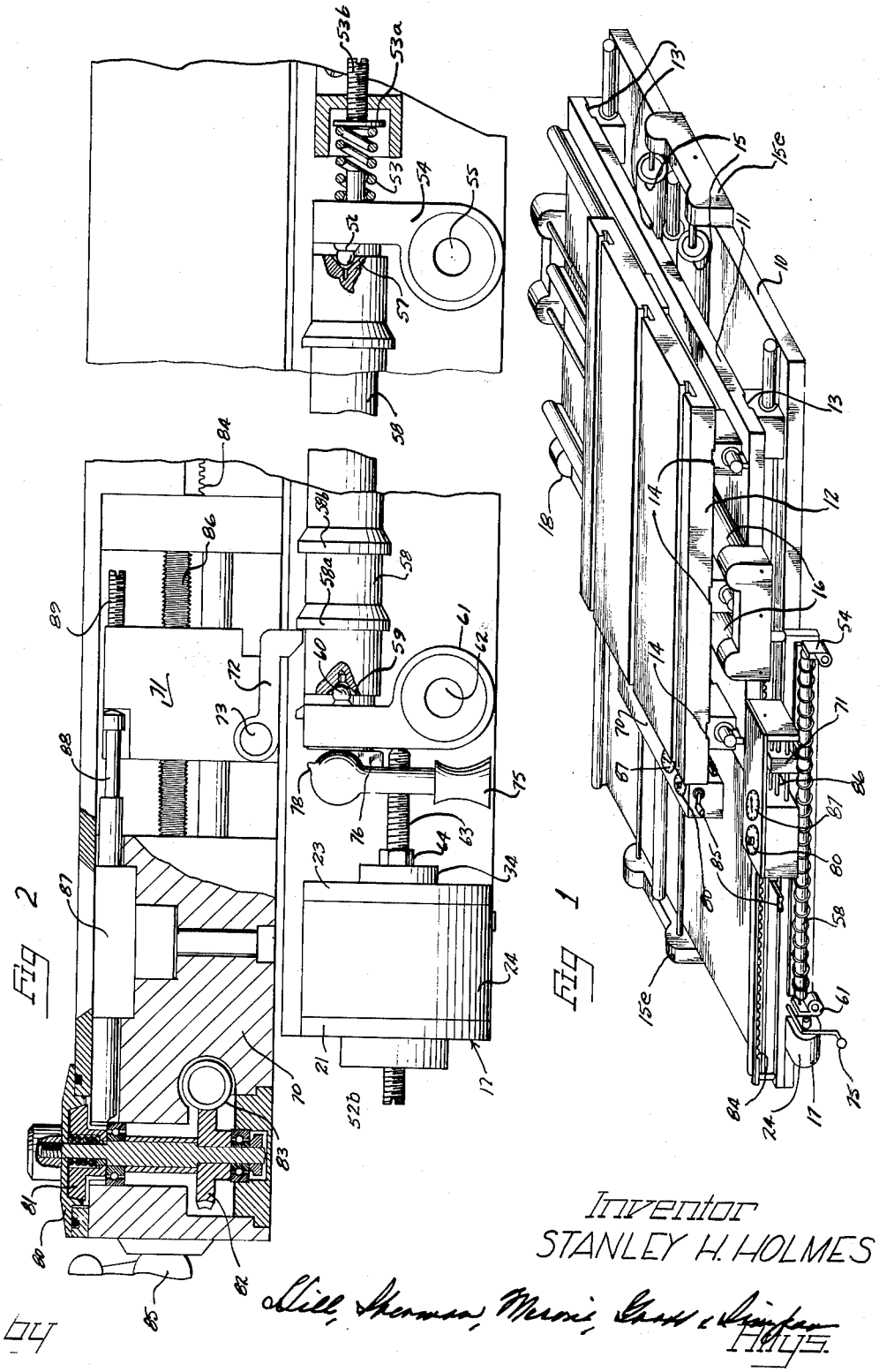
Inventor
STANLEY H. HOLMES Sept. 21, 1965 S. H. HOLMES 3,206,837
METHOD OF MANUFACTURING A RECIPROCAL FOUR-WAY SPOOL VALVE
Original Filed Nov. 7, 1958 3 Sheets-Sheet 2
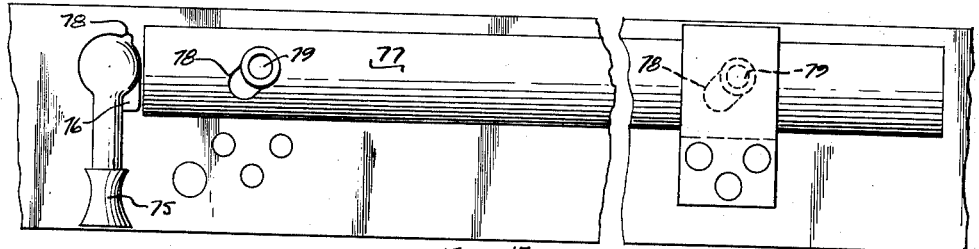
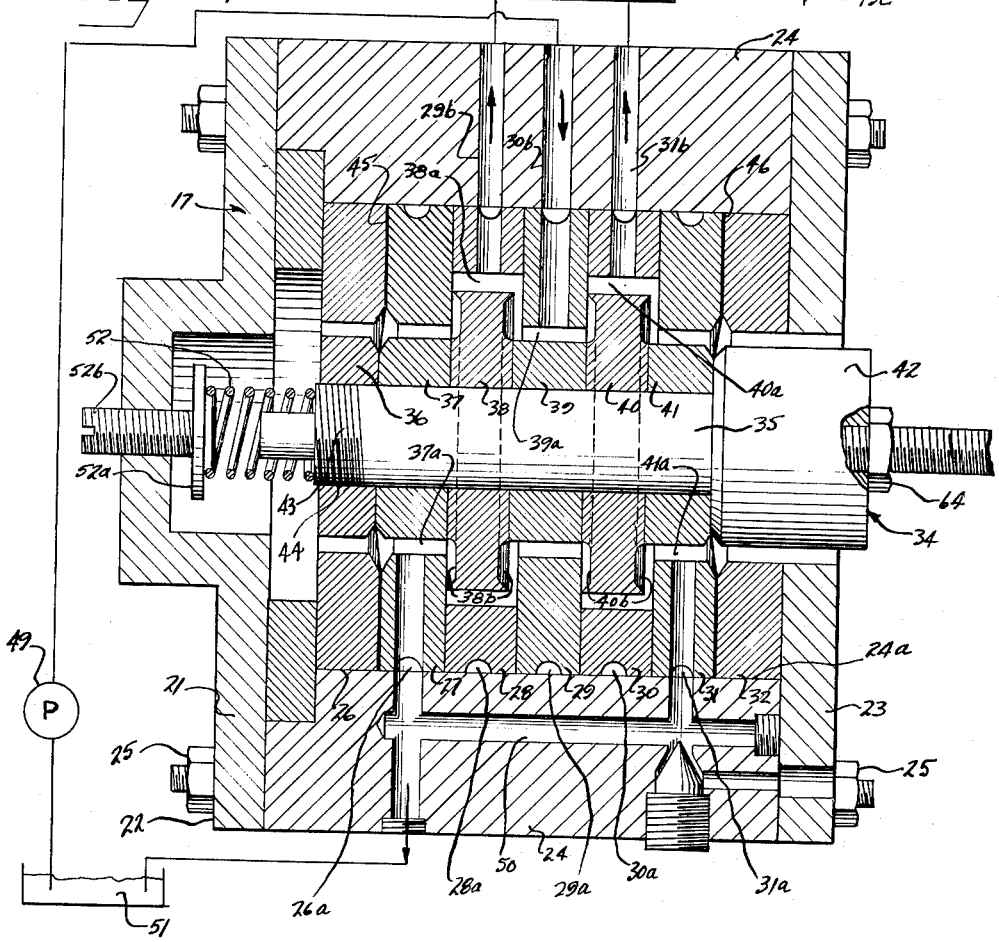
Inventor
STANLEY H. HOLMES

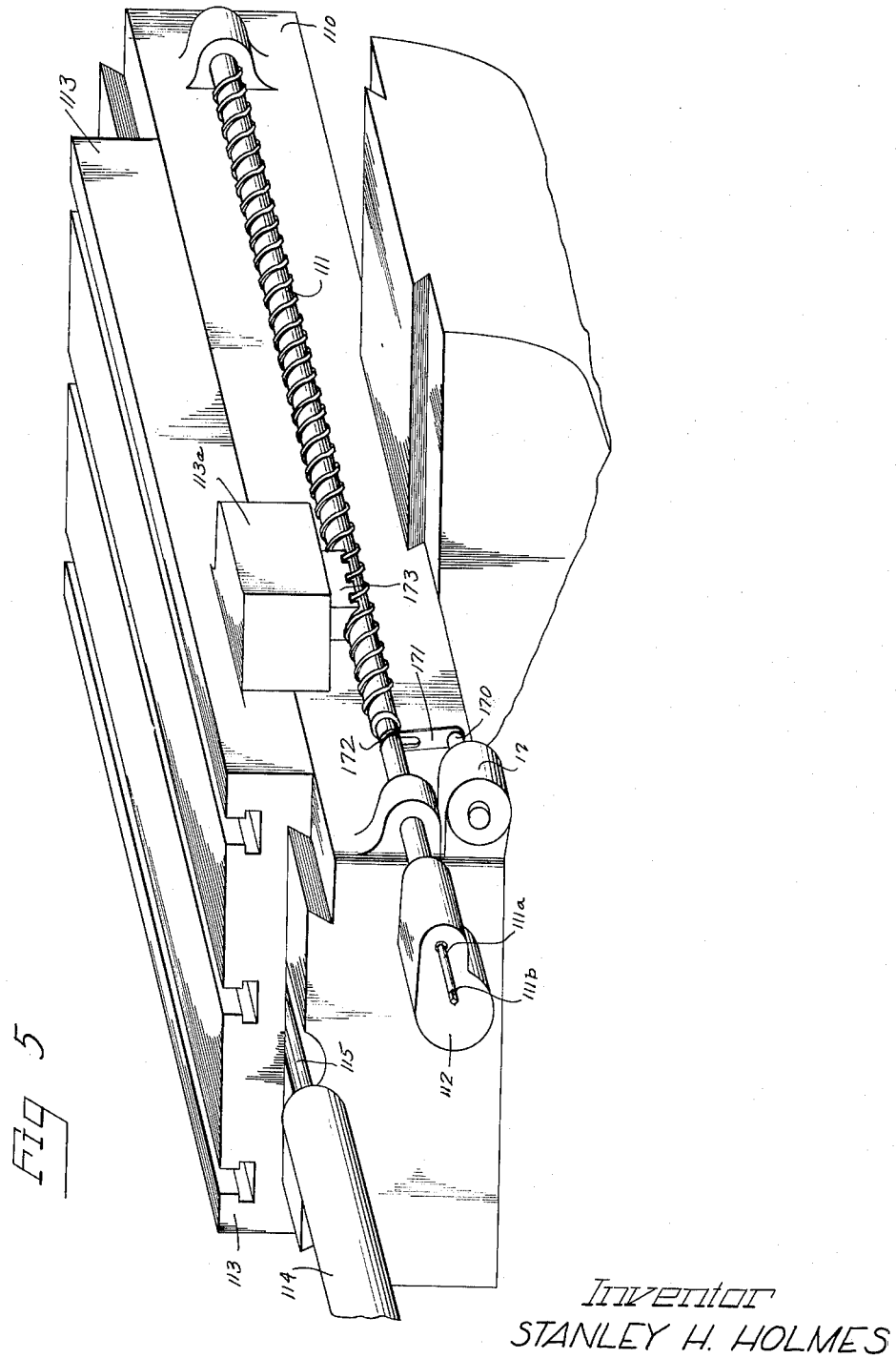

United States Patent Office 3,206,837
Patented Sept. 21, 1965

3,206,837
METHOD OF MANUFACTURING A RECIPROCAL FOUR-WAY SPOOL VALVE
Stanley H. Holmes, 4121 N. Springfield Ave., Chicago, Ill.
Continuation of application Ser. No. 772,461, Nov. 7, 1958. This application Dec. 11, 1961, Ser. No. 161,330
3 Claims. (Cl. 29—157.1)

This application is a continuation of my copending application Serial No. 772,461 filed Nov. 7, 1958 entitled Method of Manufacturing a Reciprocal Four-Way Spool Valve, now abandoned.

The present invention relates to an improved relatively inexpensive, hydraulically actuated spacing table for drill presses, milling machines, or like apparatus in which a workpiece is to be exactly positioned relative to a tool and wherein the location of the workpiece relative to the base or bed of the particular machine must be extremely accurate and capable of accurate repetition. The invention also relates to a novel control valve for such a spacing table and other uses.

Hydraulically actuated machinery has, of course, long been known in the mechanical arts. It has many well recognized advantages over electrical or mechanical drive systems both in cost and versatility. However, to my knowledge, hydraulic actuation has not been provided for such accuracy-requiring machinery as spacing tables for drill presses, drilling machines and similar equipment. This has been due to the fact that in the past sufficient accuracy of repetition has been unavailable in hydraulic systems at a cost low enough to make such systems competitively practical. The present invention, on the other hand, has provided a hydraulic spacing table apparatus which is not only extremely accurate but which is relatively inexpensive to manufacture in spite of the utilization therein of machining tolerances heretofore considered impractical, if not impossible of achievement.

In accordance with the principles of the present invention a hydraulic valve of simple construction is provided in which a continuous flow of hydraulic fluid is provided in a neutral position. Any deviation of the valve from its neutral position causes a hydraulic flow in one direction or the other of a controlled part, in the present case a spacing table or the like. By providing a valve of substantially perfect accuracy, it will center itself consistently in the same position within one thousandth of an inch, or less. As a result, by securing one of the two relatively movable parts of the valve to the spacing table and the other part to a relatively fixed part of the machine, the spacing table may automatically be exactly positioned by adjustment of the valve.

In further accordance with the present invention a master cam is provided in associated relationship with the valve to provide a series of predetermined stop position points for the spacing table, such that the table may be stopped at a plurality of predetermined, related positions. By providing a master cam for each series of operations it is possible to provide sequential positioning of the spacing table for a plurality of work operations at essentially exactly positioned locations relative to the movable spacing table. As a result a large number of workpieces may be machined or otherwise processed in exact conformity with each other by means of a simple, hydraulic system.

It is, accordingly, an object of the present invention to provide an improved and simplified hydraulic actuating system.

Still a further object of the present invention is to provide an extremely inexpensive servo control valve of extremely close tolerances.

A feature of the invention resides in a novel valve construction wherein a four-way valve is constructed by machining alternate housing and valve core parts simultaneously to provide essentially exactly the same dimensions.

Still other and further objects and features of the present invention will at once become apparent to those skilled in the art from a consideration of the attached drawings wherein preferred forms of the invention are shown by way of illustration only; and wherein:

FIGURE 1 is an isometric view of a machinery spacing table incorporating the principles of the present invention;

FIGURE 2 is an enlarged detailed view in side elevation of a portion of the spacing table shown in FIGURE 1;

FIGURE 3 is a side elevational view of a portion of the control system of the present invention;

FIGURE 4 is a cross-sectional view of the control valve incorporated in the present invention, with related hydraulic parts diagrammatically shown; and FIGURE 5 is an isometric view of a modified form of hydraulically actuated machinery table constructed in accordance with the present invention.

As shown on the drawings:

As may be seen from a consideration of FIGURE 1, the present invention comprises a movable work supporting table for machinery or the like. While the machine proper is not illustrated, it may comprise any conventional milling machine, drill jig borer, drill press, or similar equipment of which a table is movable in a general horizontal plane, it will be clear that the arrangement illustrated comprises a generally fixed platform or base table 10 rigidly secured to the machine base proper. A pair of spacer tables 11 and 12 are mounted relative to the table 10 for horizontal movement on guideways 13 and 14 respectively. Such horizontal movement is achieved by means of a pair of hydraulic motors 15 positioned between the movable table 11 and the base 10, on the one hand, and by the hydraulic motors 16 interposed between the movable table 12 and the table 11. The motors 15 and 16 comprise generally conventional reciprocating piston and cylinder type hydraulic motors or actuators. In each case the stroke of the piston relative to the cylindrical housing in which it slides, slightly exceeds the design path of movement of the respective movable table relative to the table or base carrying it. As a result of this arrangement, energization of the respective fluid motors by a control valve will permit movement of the uppermost table 12, upon which a workpiece or the like is secured, into any position within the limits of horizontal travel of either the table 11 or the table 12.

It will be apparent to those skilled in the art that the problem faced in providing a satisfactory work carrying table 12, positioned by means of hydraulic motors lies mainly in providing sufficiently accurate control to permit exact placement of the table. An approximate placement of the table is worthless for modern day machining operations. Substantially exact placement is, however, achieved in the cast of the present invention through utilization of the reciprocal power motors 15 and 16 under the control of identical servo valves 17 and 18. The specific internal construction of the valves 17 and 18 may be more clearly understood from a consideration of FIGURES 2–4.

In FIGURE 4 the valve 17 is specifically illustrated. It will be understood, however, that the valve 18 is identical in construction therewith. As there shown, the valve comprises a fixed housing 21 rigidly secured to the base table member 10. The housing 21 comprises end plates 22 and 23 secured to a generally cylindrical portion 24 by means of cap screws 25, or the like. Within the bore 24a of the housing member 24, the plurality of annular segments 26, 27, 28, 29, 30, 31 and 32 are provided. As will be apparent from a consideration of the drawings, the outside diameter of each of these segments or disks corresponds substantially with the internal diameter of the bore 24a. Accordingly, upon assembly of the respective segments within the bore 24a, and securement of the covers 21 and 23 to the portion 24, a rigid assembly is provided. Within the generally longitudinal bore provided within the annular segments or disk members 26, 27, 28, 29, 30, 31 and 32, a valve core generally indicated at 34 is provided. The core comprises a spool 35 carrying annular segments 36, 37, 38, 39, 40, 41 and a rigid abutment member 42. The respective segments 36, 37, 38, 39, 40 and 41 are rigidly maintained in position by means of a threaded connection comprising threads 43 on the core portion 35 and internal threads 44 in the annular segment 36. The core 34 is centered relative to the longitudinal axis of the bore 24a in a manner described below and is sealed relative to the housing by a pair of flexible diaphragm seals 45 and 46 which are clamped, respectively, between the disks 26, 27 and 36, 37 at the left-hand end as viewed in FIGURE 4 and between the disks 31, 32 and 41, 42 at the right-hand end of the valve as viewed in FIGURE 4. These diaphragms are constructed of any convenient resilient material such as flexible metal, plastic, reinforced rubber or the like and operate to maintain the valve core 34 axially centered relative to the bore 24a while permitting its longitudinal reciprocation relative thereto. This reciprocation may be accomplished externally in a manner to be described below and is limited, in the form of the invention illustrated, to a small fraction of an inch total relative travel. This limitation is imposed by the fact that the disks 38 and 40 are of larger diameter than the enclosing disks 27, 29 and 31 and accordingly abut the latter disks upon reciprocal movement away from a centered condition. Such abutment, in the direction of left-handed core movement as viewed in FIGURE 4, is illustrated in that figure with the disks 38 and 40 in contact with the respective disks 27 and 29.

As may be seen from FIGURE 4, the disks 28, 29 and 30 are provided respectively with annular hydraulic passageways 28a, 29a and 30a which are connected, repectively, to ports 29b, 30b and 31b in the housing portion 24. The ports 29b, 30b and 31b connect, respectively, with a first side of the hydraulic motor 15, as at 15a, a source of fluid under pressure 49, and a second side of the fluid motor 15, as at 15b. The respective disks 27 and 31 are likewise provided with annular grooves 26a and 31a which are connected to a common sump port 50 leading to a low pressure reservoir 51 of the pump 49.

The core 34 of the valve is normally positioned relative to the housing 24 by means of a pair of helical springs 52 and 53 shown, respectively, in FIGURES 4 and 2. As shown, the spring 52 is supported by an abutment 52a and acts directly against the left-hand end of the core 35. At the other end, however, the spring 53 is supported by an abutment 53a carried by the fixed base table 10 and acts against bracket 54 pivotally mounted on the frame 10 at pin 55. The bracket 54 carries a centering ball 56 which co-operates with the centering hole 57 in a cam abutment bar 58. The cam abutment bar has a centering hole 59 at its left-hand end as viewed in FIGURE 2 which, in turn, co-operates with a centering ball 60 carried by a bracket 61 pivotally mounted on a pin 62. The bracket 61 rests against the rounded end of threaded extension 63 adjustably secured relative to the core 34 by means of a lock nut 64. Adjustment of the respective screws 52b and 53b permits accurate adjustment of the spring forces acting on valve core 34. In the event that a cam abutment bar 58 having slightly different lengths is employed, the further adjustment at 64 may be utilized if desired.

In the centered position of the valve core 34 it will be clear that fluids pumped from the pump 49 through port 30b will divide and flow equally into the annular recesses 38a and 40a, and from thence to sump 51, thereby applying identical pressures to the sides 15a and 15b of the actuating motor 15. It is preferable that the output of the pump 49 be greater than the maximum flow rate passed by the valve 17 when in its neutral or open position. As a result of such an arrangement, a positive pressure will exist in both chambers 38a and 40a when the valve is in neutral, and this oil under pressure will resist any movement of the table by externally applied forces. However, upon shifting of the core into a position away from centered, such as for example in the left-hand position as shown in FIGURE 4, fluid pressure applied to the annular chamber 39a will be applied to the chamber 38a and chamber 15a of the fluid motor 15 at an increased rate. Simultaneously, contact between the chamber 39a and chamber 40a will be cut off by the annular segment 40. Also, simultaneously, the chamber 40a will be more fully ported to the sump chamber 41a and the sump chamber 37a will be disconnected from the annular chamber 38a by the left-hand face of the segment 38. In the circumstances, positive pressure is applied to side 15a of the motor while the pressure applied to the side 15b drops to sump pressure, with resultant right-hand movement of the piston 15c relative to the motor cylinder 15. Preferably motor 15 is secured to fixed attachment brackets 15e rigidly attached to the base table 10. Accordingly, pressurization of chamber 15a and depressurization of chamber 15b upon left-hand movement of the valve core 34 causes right-hand movement of the table 11 while, conversely, pressurization of chamber 15b and depressurization of chamber 15a upon right-hand movement of core 34, causes a left-hand movement of the table 11.

In operation, the valve core 34 is centered relative to predetermined reference points determined by the cam abutment bar 58. It will be seen from a consideration of FIGURES 1 and 2 that the table 11 carries, secured thereto, an indicator box 70. Adjustably mounted relative to the box 70 is a bracket 71 carrying a dog 72 pivotally mounted on a pin 73. The dog 72 is gravitationally biased downward, or in the clockwise direction into an interference relation with abutment 58a of the cam abutment bar 58. With the dog in the position shown, therefore, right-hand movement of the table 11, carrying the dog toward the right, will cause movement of the cam abutment bar 58 toward the right compressing spring 53 and permitting spring 52 to move the valve core 34 toward the right which in turn will cause energization of the motor 15 to cause movement of the table 10 and the dog 72 toward the left to center the valve. At the point in which the spring 53, which is stronger than 52, is effectively counterbalanced by the force applied by dog 72 and spring 52, the table will come to a centered, rest, condition, which position will be exactly controlled by the position of the abutment 58a and the cam abutment bar 58. The table 10 may be moved to a further right-hand position by lifting the dog 72. Such lifting movement will permit the spring 53 to override the spring 52 causing movement of the table 10 toward the right until it strikes a second cam abutment 58b when the above-mentioned centering action will again take place. Disengagement of the dog 72 from the abutment 58a, 58b with which it is in contact may be accomplished by counterclockwise movement of the handle 75. Such movement causes a cam surface 76 to engage delatching bar 77, shown in FIGURE 3. The bar 77 is slotted as at 78, 78 and is mounted on pins 79, 79 carried on the base table 10. Accordingly, movement of the bar 77 toward the right by the cam surface 76 will cause vertically upward movement of the bar 77, which vertically upward movement engages the dog 72 pivoting it momentarily out of contact with a respective cam abutment and permitting movement of the table 11 toward the right. Maintenance of the handle 75 in its delatching position will permit movement of the table toward the right past such of the cam abutments as the operator may desire to pass and centering of the machine into an adjusted table position will not take place until the lever 75 is returned to its neutral position and the dog 72 is permitted to engage one of the abutments. Movement of the table 11 in the left-hand direction may readily be accomplished by rotation of the handle 75 in the clockwise direction in which event the cam projection 78 engages the bracket 61 biasing it in the clockwise direction and relieving the pressure of the spring 53 from the valve core 34 causing the core 34 to move toward the right-hand side under the influence of spring 52. As explained above, this right-hand movement of the valve core 34 will cause left-hand movement of the table 11 until such time as the handle 75 is returned to its neutral, vertical position as shown in FIGURE 2.

In the specific form illustrated in FIGURES 1 and 2, the cam abutment bar 58 is provided with abutments 58a, 58b, etc., spaced equally one inch apart. With such an arrangement the table may be positioned exactly at one inch increments by counterclockwise manipulation of the handle 75 and release thereof as soon as the dog 72 has cleared each successive abutment. The position of the table is indicated on a dial 80 driven through a spring clutch 81 rotated by worm gear 82. The worm gear 82 is in turn driven by a helical gear 83 in spur gear engagement with the rack 84. The rack 84 is, as shown in FIGURE 1, rigidly secured to the base table 10, and accordingly, as the indicator box 70 moves with the table 11, the rack 84 rotates the helical gear 84 to operate the dial 80. An initial adjustment of the indicator 80 may readily be provided by manually setting the indicator 80 relative to the clutch 81 which is merely a friction drive connection.

The indicator box 70 is also provided for means for providing an exact positioning of the table intermediate the one inch increments established by the cam abutment bar 58. This is accomplished by movement of the dog 72 relative to the table 11. In the form illustrated, such movement is accomplished by means of a manual crank 85 operatively driving a rotatable screw 86 threadably engaged with the dog carrying block member 71. The block member 71 may be moved throughout a range of two inches. This position is exactly indicated on indicator 87 operable through a one inch range by reciprocal push rod 88. The indicator 87 may be of any conventional form and may be accurate to $\frac{1}{1000}$ of an inch. Obviously, if the table is moved to a position in which the dog abuts against the abutment 58a, the table 11 may be moved a distance less than an additional inch by adjusting the block 71 toward the left. The distance of such movement is exactly indicated on the indicator 87 and, as the block 71 moves toward the left the table is permitted to move toward the right until dog 72 acts against the abutment 58a to balance the valve 17. As a result of this arrangement the position of the table 11 may be exactly spaced in an extremely simple manner. Provision of a two inch range of movement for block 71 allows initial set up adjustment within that range.

It will, of course, be apparent that the positioning or spacing of the table 12 may be accomplished in exactly the same manner as table 11 except that table 12 uses as its fixed point of reference the table 11 and travels in a direction transversely of the path of movement of table 11. Exactly the same control equipment may be used, as indicated in FIGURE 1 where the indicator box and valve are illustrated and carry the same numbers employed in the description above.

A zero adjustment for the indicator 87 is provided by an adjusting screw 89 passing through the block 71 and abutting against the right-hand end of the reciprocal plunger 88. Through the use of this adjusting screw any base reference point may be employed in spacing of the apparatus, which reference point may be determined by the actual position of the work when bolted to the table 12.

Satisfactory operation of a hydraulic table of the type hereinabove set forth requires, when it is to be employed in manufacture of parts having critical dimensions, that the valve 17 be absolutely accurate. This is accomplished in an extremely simple manner in accordance with the principles of the present invention. As above indicated the valve is constructed of a plurality of stacked disk members. To provide exactly accurate operation it is essential in such a reciprocating valve structure that the disk 38 and the disk 40 contact the respective disks 27 and 29 simultaneously when the valve core is moved to the left and, conversely, contact the respective disks 29 and 31 when the valve core is moved to the right. If one disk contacts while the other is out of contact inaccuracy of control results. This is true whether or not the disks 38 and 40 are larger in diameter than the internal diameter of the annular disk members 27, 29 and 31. If the disks 38 and 40 are, for example, the same diameter as the internal diameter of the disks 27, 29 and 31 the minimum flow cut-off point is still determined by the point at which the outer peripheral edge of the disks 38 and 40 instantaneously overlap the respective disks 27, 29, or 29 and 31.

In the manufacture of valves heretofore known, the exact dimensioning of the respective disks has been a major problem and to provide such exact dimensions has been extremely costly. As those skilled in the art of machinery are aware, manufacture of any parts having a large number of surfaces which must bear a relationship to each other within $\frac{1}{10000}$" or less, is extremely expensive and is, in many instances, practically impossible of accomplishment on a mass production scale at all. In the present structure, however, its accomplishment is both simple and inexpensive and, further, readily adapted to mass production techniques. In manufacturing the core and housing assembly, the disks 38, 29 and 40 are machined to the same axial thickness. The disks 28, 39 and 30 are all machined to a second, larger, thickness. It is relatively unimportant what the difference between these two thicknesses is, except insofar as it dictates the dimensions of the maximum flow orifice (as for example between the disk 38 and the disk 29 in FIGURE 4). The sameness of axial dimension of the three disks 38, 29 and 40 may be accomplished by placing all three disks on a flat grinding machine table and passing all three under a grinding wheel. If desired, the three may be lapped simultaneously on a lapping table subsequent to the grinding operation. By grinding and lapping the three disks simultaneously on the same table they will all have the same thickness substantially exactly even though there may be a slight variation between sets of disks. Similarly, the three disks 28, 39 and 30 are simultaneously ground and lapped on the same machine table. The result of this method of manufacture is a valve in which the disks 38 and 40 will bear exactly the same relationship to the respective disks 27, 39 and 31, and accordingly, the valve will be perfectly balanced. The annular grooves 38b and 40b are provided to prevent hydraulic forces acting against the disks 38 and 40 from action to retain the valve in an uncentered position and assure hydraulic balance of the valve core.

It will be apparent to those skilled in the machinery arts that by employing the above method of operation phenomenal tolerances are achieved. These tolerances are achieved in the simplest of manners and without the need of extremely accurate and complex equipment employed in prior art methods. It has been found that valves manufactured in accordance with this method provide, in operating a spacing table, substantially exact table placement time after time, duplicating the performance of equipment many times the cost of the relatively simple hydraulic apparatus herein described.

The valve of the present invention, as above described may also be employed in providing a variable speed drive of a hydraulic type, for a movable table. This is illustrated in FIGURE 5. As there shown, a base table 110 carries a constant pitch lead screw 111 mechanically driven by any desired form of variable speed drive, indicated at 112. This may comprise a light duty gear drive mechanism having an output torque only moderately in excess of the torque required to rotate the screw 110, since for the reasons to be advanced below, the drive screw provides none of the actual power for operation of the spacing table 113. The table 113 is hydraulically driven by means of conventional reciprocating type piston and cylinder hydraulic motor 114 having a piston rod 115. The piston rod 115 is secured in any conventional manner to the table 113 and the cylinder 114 is likewise secured in any conventional manner to the base table 110. A hydraulic servo valve 17, constructed the same as valve 17 shown in FIGURES 1-4, is secured to the table 110. The core thereof, not specifically illustrated in FIGURE 5, is centered internally by axially operating springs, not shown, in the same manner as spring 52 is applied in FIGURE 4. The core 170 has secured thereto a vertically upstanding arm 171 engaged with an annular groove 172 in the lead screw 111. The lead screw 111 engages a half nut 173 rigidly secured to the table 113 at support 113a. Hydraulic movement of the table 113 is then readily accomplished by starting the variable speed drive, such as by energization of an electric motor thereof. Rotation of the lead screw 111 will, assuming the table 113 is initially immovable, cause reciprocation of the lead screw 111 against the arm 171 and the centering springs of the valve 17. This reciprocation will uncenter the valve 17 and cause actuation of the motor 114 to move the table 113. Since the table 113 carries the half nut 173 with it the movement of the table 113 will continue at a rate exactly controlled by the rate of rotation of the lead screw 111. If the table were to lag behind, the valve 171 would be reciprocated to a further open position while, alternatively, if the table were to advance faster than the rate of the screw 111 dictated, the valve 17 would be centered and no additional motor power would be applied to the motor 114. Obviously, the only limitation on the rate of movement of the table 113 is the maximum rate of flow permitted by the valve 17 and this rate may readily be controlled by the difference in thickness between the respective sets of valve disks containing the disks 28, 39, 30 and 38, 29, 40 as above set forth. The table may also be advanced manually by providing an extension 111a of the lead screw 111. The extension 111a is provided with a square end 111b to which a wrench handle may be attached. In the above manner, an extremely heavy table 113 may be moved by a device having practically no torque output requirement or, manually, with a minimum of effort. Further, although the table 113 is moved by hydraulic power, the rate of movement is exactly controlled and is dependent only on the accuracy of the small, and relatively delicate, variable speed drive which, accordingly, may be constructed with extreme accuracy.

It will be apparent to those skilled in the art that the output of pump 49 may be varied, if desired, by any conventional means, to provide different "neutral" pressures in the motor 15. Further, it will be seen that the abutment cam bar 58 may comprise a threaded bar having a plurality of nut abutment members threaded thereon so that the abutments may easily be adjusted relative to each other to provide a sequence of spacings for a mass production job in which many parts are to be made employing the same spacing sequence. The bar 58 may, if desired, be rotated on its axis by an indexing means between successive table passes. For example, the abutments 58a, 58b, etc., may have an angular width approximately 60° and rotation of the bar 58 60° after the first pass of the table would permit a second series of abutments unrelated to the first series, to control the next pass of the table. Thus six cam bars could be combined into a single bar unit. A convenient indexing mechanism would comprise, for example, a spring detent ball on the surface of the member 54 facing the bar 58 and adapted to seat in one of six angularly spaced sockets in the end face of the cam bar depending on the angular position of the bar 58.

It will be clear from the above description that I have provided a greatly improved hydraulic table moving apparatus and valve mechanism therefor. Since variations and modificatons beyond those above discussed may obviously be readily accomplished without departing from the scope of the novel concepts of the present invention, it is my intention that the scope of the present invention be limited solely by the scope of the hereinafter appended claims.

I claim as my invention:

1. The method of manufacturing a reciprocal four-way spool valve having a reciprocal core comprising a pair of annular land portions spaced by an annular reduced diameter portion and a housing co-operable therewith comprising a pair of annular portions of large internal diameter spaced by a first annular portion of reduced internal diameter and which in turn space a second pair of reduced diameter portions, which consists of forming each of said portions as a separate annular member and machining said pair of annular land portions and said first annular portion of reduced internal diameter simultaneously to the same thickness and likewise machining said pair of annular portions of large internal diameter and the annular reduced diameter portion of said core simultaneously to a second same thickness and assembling said core and housing together with the annular lands of the core in face-to-face correlation with the housing portions of large internal diameter and with the reduced diameter portion of the core in face-to-face relation with the first reduced internal diameter portion of the housing and with the second pair of reduced diameter portions positioned on axially opposite sides of said annular portions of large internal diameter.

2. The method of manufacturing a reciprocal four-way spool valve having a reciprocal core comprising a pair of annular land portions spaced by an annular reduced diameter portion and a housing co-operable therewith comprising a pair of annular portions of large internal diameter spaced by a first annular portion of reduced internal diameter and which in turn space a second pair of reduced diameter portions, which consists of forming each of said portions as a separate annular member and machining said pair of annular land portions and said first annular portion of reduced internal diameter simultaneously to the same thickness and likewise machining said pair of annular portions of large internal diameter and the annular reduced diameter portion of said core simultaneously to a second same thickness, and wherein said simultaneous forming is accomplished by placing the respective parts simultaneously on a grinder bed plate on their axially facing side surfaces and surface grinding the axial surfaces thereof together by the same grinding wheel and assembling said core and housing together with the annular lands of the core in face-to-face correlation with the housing portions of large internal diameter and with the reduced diameter portion of the core in face-to-face relation with the first reduced internal diameter portion of the housing and with the second pair of reduced diameter portions positioned on axially opposite sides of said annular portions of large internal diameter.

3. The method of manufacturing a reciprocal four-way spool valve having a reciprocal core comprising a pair of annular land portions spaced by an annular reduced diameter portion and a housing co-operable therewith comprising a pair of annular portions of large internal diameter spaced by a first annular portion of reduced internal diameter and which in turn space a second pair of reduced diameter portions, which consists of forming each of said portions as a separate annular member and machining said pair of annular land portions and said first annular portion of reduced internal diameter simultaneously to the same thickness and likewise machining said pair of annular portions of large internal diameter and the annular reduced diameter portion of said core simultaneously to a second same thickness, and wherein the simultaneous machining comprises the step of placing the respective parts simultaneously on a flat surface on their axially facing surfaces and removing metal from the opposite axially facing surface by a tool passing over the respective parts sequentially without change of adjustment relative to said plate and assembling said core and housing together with the annular lands of the core in face-to-face correlation with the housing portions of large internal diameter and with the reduced diameter portion of the core in face-to-face relation with the first reduced internal diameter portion of the housing and with the second pair of reduced diameter portions positioned on axially opposite sides of said annular portions of large internal diameter.

References Cited by the Examiner

UNITED STATES PATENTS

| | | | |
|---|---|---|---|
| 2,051,052 | 8/36 | Morgan | 90—21.5 |
| 2,559,839 | 7/51 | Andrew et al. | 90—21.5 |
| 2,705,829 | 4/55 | Mock | 29—157.1 |
| 2,796,081 | 6/57 | Dannevig et al. | 29—157.1 X |
| 2,839,079 | 6/58 | Holmes | 137—625.5 X |
| 3,052,963 | 9/62 | Williams | 29—157.1 |

WHITMORE A. WILTZ, *Primary Examiner.*

RICHARD H. EANES, JR., *Examiner.*